United States Patent
Sawauchi et al.

(10) Patent No.: US 8,540,901 B2
(45) Date of Patent: *Sep. 24, 2013

(54) AQUEOUS FLUORORESIN DISPERSION AND METHOD FOR PRODUCING THE SAME

(75) Inventors: Chie Sawauchi, Settsu (JP); Nobuhiko Tsuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,237

(22) Filed: Dec. 8, 2011

(65) Prior Publication Data

US 2012/0077915 A1 Mar. 29, 2012

Related U.S. Application Data

(62) Division of application No. 12/306,452, filed as application No. PCT/JP2007/062998 on Jun. 28, 2007, now abandoned.

(30) Foreign Application Priority Data

Jun. 29, 2006 (JP) .................................. 2006-180245

(51) Int. Cl.
*H01B 1/00* (2006.01)
*C08L 27/12* (2006.01)

(52) U.S. Cl.
USPC .......................................... 252/500; 524/544

(58) Field of Classification Search
USPC .......................................... 252/500; 524/544
See application file for complete search history.

(56) References Cited

U.S. PATENT DOCUMENTS

| | | | |
|---|---|---|---|
| 6,169,139 B1 | 1/2001 | Van Cleeff | |
| 7,968,644 B2 * | 6/2011 | Sawauchi et al. | 524/544 |
| 2004/0143052 A1 | 7/2004 | Epsch et al. | |
| 2004/0171736 A1 | 9/2004 | Dadalas et al. | |
| 2004/0186219 A1 | 9/2004 | Dadalas et al. | |
| 2005/0107506 A1 | 5/2005 | Kapeliouchko et al. | |
| 2005/0154104 A1 | 7/2005 | Malvasi et al. | |
| 2005/0222313 A1 | 10/2005 | Tomihashi et al. | |
| 2006/0041051 A1 | 2/2006 | Nakatani et al. | |
| 2007/0282044 A1 | 12/2007 | Cavanaugh et al. | |
| 2007/0282054 A1 * | 12/2007 | Johnson et al. | 524/544 |

FOREIGN PATENT DOCUMENTS

| | | |
|---|---|---|
| EP | 0818506 A1 | 1/1998 |
| JP | 2002-513051 A | 5/2002 |
| JP | 2005-008775 A | 1/2005 |
| JP | 2005-501956 A | 1/2005 |
| JP | 2005-126715 A | 5/2005 |
| JP | 2005-171250 A | 6/2005 |
| JP | 2005-200650 A | 7/2005 |
| WO | WO 99/55746 A1 | 11/1999 |
| WO | WO 2004/050719 A1 | 6/2004 |

OTHER PUBLICATIONS

Tervoort et al., "Melt-processable Poly(tetrafluoroethylene)," Macromolecules, 33, pp. 6460-6465 (2000).*

* cited by examiner

*Primary Examiner* — Mark Kopec
*Assistant Examiner* — Jaison Thomas
(74) *Attorney, Agent, or Firm* — Sughrue Mion, PLLC

(57) ABSTRACT

The present invention provides an aqueous fluororesin dispersion comprising a melt-processable fluororesin which is low in fluorinated surfactant concentration and excellent in dispersion stability even when the concentration of the melt-processable fluororesin is high. The present invention is related to an aqueous fluororesin dispersion comprising a melt-processable fluororesin particle dispersed in an aqueous medium, wherein a concentration of the melt-processable fluororesin is 55 to 75% by mass relative to the aqueous fluororesin dispersion, and a fluorinated surfactant content in the aqueous fluororesin dispersion is not higher than a level corresponding to 100 ppm of the melt-processable fluororesin.

6 Claims, No Drawings

AQUEOUS FLUORORESIN DISPERSION AND METHOD FOR PRODUCING THE SAME

CROSS-REFERENCE TO RELATED APPLICATIONS

This application is a Rule 53(b) Divisional of U.S. patent application Ser. No. 12/306,452 filed Dec. 23, 2008, which is a 371 of PCT Application No. PCT/JP2007/062998 filed Jun. 28, 2007, which claims benefit to Japanese Patent Application No. 2006-180245 filed Jun. 29, 2006. The above-noted applications are incorporated herein by reference in their entirety.

TECHNICAL FIELD

The present invention relates to an aqueous fluororesin dispersion and a method for producing the same.

BACKGROUND ART

Aqueous fluororesin dispersions comprising a melt-processable fluororesin can be molded into films excellent in chemical stability, nonstickiness, weathering resistance and other characteristics by the coating, impregnation or other method and therefore are widely used in such fields of application as cooking utensils, pipe linings and impregnated glass cloth membranes. In these applications, it is preferred that the aqueous fluororesin dispersions comprising a melt-processable fluororesin be high in fluororesin concentration; therefore, those products obtained by polymerization of a fluorinated monomer or monomers in an aqueous medium in the presence of a fluorinated surfactant and the subsequent concentration are generally used. However, it is desirable from the cost viewpoint to remove the fluorinated surfactant from the aqueous fluororesin dispersions.

A method so far proposed for removing the fluorinated surfactant from aqueous fluororesin dispersions comprises repeating substantially three times the phase separation procedure in the presence of a nonionic surfactant and an electrolyte, wherein, each time, the supernatant is separated and the lower phase is recovered (cf. e.g. Patent Document 1 and Patent Document 2). However, these documents make no substantial disclosure about a concentration, by phase separation, of aqueous fluororesin dispersions comprising a melt-processable fluororesin.

In Patent Document 3 and Patent Document 4, there are described aqueous fluororesin dispersions reduced in viscosity by addition of a nonfluorinated anionic surfactant following the reduction in PFOA content by means of an anion exchange resin. Patent Document 5 describes a method of reducing the fluorinated surfactant content by bringing an aqueous fluororesin dispersion having a certain level of conductivity into contact with an anion exchange resin. However, these documents do not make any mention of the concentration by phase separation.

Patent Document 1: Japanese Kokai Publication 2005-126715
Patent Document 2: Japanese Kokai Publication 2005-171250
Patent Document 3: United States Patent Application Publication 2004/186219
Patent Document 4: United States Patent Application Publication 2004/171736
Patent Document 5: United States Patent Application Publication 2004/143052

DISCLOSURE OF INVENTION

Problems which the Invention is to Solve

In view of the above-discussed state of the art, it is an object of the present invention to provide an aqueous fluororesin dispersion comprising a melt-processable fluororesin which is low in fluorinated surfactant concentration and excellent in dispersion stability even when the concentration of the melt-processable fluororesin is high.

Means for Solving the Problems

The present invention provides an aqueous fluororesin dispersion comprising a melt-processable fluororesin particle dispersed in an aqueous medium, wherein a concentration of the melt-processable fluororesin is 55 to 75% by mass relative to the aqueous fluororesin dispersion, and a fluorinated surfactant content in the aqueous fluororesin dispersion is not higher than a level corresponding to 100 ppm of the melt-processable fluororesin.

The invention also provides a method for producing the aqueous fluororesin dispersion, wherein a raw aqueous fluororesin dispersion comprising a melt-processable fluororesin particle dispersed in an aqueous medium is subjected to a treatment in contact with an ion exchange resin and a concentration by phase separation in the presence of an electrolyte and/or a nonfluorinated anionic emulsifier to thereby obtain the aqueous fluororesin dispersion.

In the following, the present invention is described in detail.

The aqueous fluororesin dispersion of the invention has a melt-processable fluororesin concentration increased to a level as high as 55 to 75% by mass relative to the aqueous fluororesin dispersion, with the fluorinated surfactant content reduced to a level corresponding to 100 ppm of the melt-processable fluororesin or lower. In the prior art, it has been difficult to simultaneously attain both the reduction in fluorinated surfactant content and the increase in fluororesin concentration in melt-processable fluororesin-containing aqueous dispersions. With the aqueous fluororesin dispersion of the invention, both the intentions have been accomplished simultaneously by causing an electrolyte and/or a nonfluorinated anionic emulsifier to be contained in the dispersion.

The above mentioned melt-processable fluoropolymers are the melt flowable fluoropolymers. As such melt-processable fluororesin, there may be mentioned, for example, vinylidene fluoride [VdF]/hexafluoropropylene [HFP] copolymers, tetrafluoroethylene [TFE]/VdF copolymers, TFE/propylene [Pr] copolymers, TFE/perfluoro (vinyl ether) [PFVE] copolymers, TFE/HFP copolymers [FEPs], VdF/PFVE copolymers, TFE/ethylene [Et]/PFVE copolymers, TFE/Pr/PFVE copolymers, TFE/PFVE copolymers [PFAs], TFE/VdF/HFP copolymers, TFE/VdF/HFP/chlorotrifluoroethylene [CTFE] copolymers, VdF/TFE/PFVE copolymers, TFE/Et/HFP/PFVE copolymers and TFE/Pr/HFP/PFVE copolymers and, among them, FEPs and PFAs are preferred. In the art, there are no aqueous fluororesin dispersions high in melt-processable fluororesin concentration and low in PFOA content among the aqueous fluororesin dispersions with particles of such a melt-processable fluororesin dispersed therein.

In the aqueous fluororesin dispersion of the invention, the concentration of the melt-processable fluororesin as mentioned above is 55 to 75% by mass relative to the aqueous fluororesin dispersion. The concentration is preferably not higher than 70% by mass. When the melt-processable fluororesin concentration is within the above range, it becomes possible to reduce the cost of transportation of the aqueous fluororesin dispersion and increase the thickness of the coatings obtainable therefrom.

The melt-processable fluororesin concentration mentioned above is determined by placing about 1 g (X) of the sample in an aluminum cup with a diameter of 5 cm, drying the sample at 100° C. for 1 hour and further drying at 300° C. for 1 hour and then calculating, based on the residue (Z) upon such heating, the value P according to the formula: P=Z/X× 100(%).

Particles of the melt-processable fluororesin mentioned above generally have an average primary particle diameter of 10 to 400 nm, preferably 20 to 200 nm. The average primary particle diameter is determined by measurements according to the dynamic light scattering method.

In the practice of the invention, the aqueous medium is not particularly restricted provided that it contains water; thus, it may contain, in addition to water, a nonfluorinated organic solvent such as an alcohol, ether, ketone or paraffin wax and/or a fluorinated organic solvent.

The aqueous fluororesin dispersion of the invention preferably contains an electrolyte in an amount corresponding to 10 to 5000 ppm of the melt-processable fluororesin mentioned above and/or a nonfluorinated anionic emulsifier in an amount corresponding to 10 to 5000 ppm of the melt-processable fluororesin mentioned above. When the content of the electrolyte and/or the nonfluorinated anionic emulsifier is below the above range, problems may occur, for example the concentration of the melt-processable fluororesin cannot be increased to a sufficient extent and, when it is in excess of the above range, the mechanical stability and/or storage stability of the aqueous dispersion may sometimes decrease.

The electrolyte and/or nonfluorinated anionic emulsifier each preferably amounts to a level corresponding to 100 to 3000 ppm, more preferably to 500 to 2500 ppm, of the melt-processable fluororesin mentioned above.

The above-mentioned electrolyte is not particularly restricted but maybe, for example, sulfuric acid, succinic acid, carbonic acid, or a salt thereof, and ammonium sulfate is preferred among others. Those may be used singly or two or more of them may be used in combination.

The nonfluorinated anionic emulsifier, so referred to herein, exhibits emulsifying activity. The nonfluorinated anionic emulsifier conceptually differs from the electrolyte mentioned above in that it has the activity mentioned above.

As the nonfluorinated anionic emulsifier, there may be mentioned those compounds a 0.1% (by mass) aqueous solution of which shows a surface tension of, for example, not higher than 60 mN/m, preferably not higher than 50 mN/m.

The surface tension mentioned above is the value measured by the Wilhelmy method.

The nonfluorinated anionic emulsifier may have an acid group provided that the surface tension is within the above range. The acid group is preferably selected from the group consisting of a carboxyl group, a sulfonyl group, a phosphoric acid group, and salts thereof, more preferably selected from the group consisting of a carboxyl group and a sulfonyl group as well as salts thereof.

In the practice of the invention, the nonfluorinated anionic emulsifier may contain, in addition to the acid group mentioned above, a polyoxyalkylene group in which each oxyalkylene group contains 2 to 4 carbon atoms, an amino group, or some other group. The amino group in this surfactant is a nonprotonated one.

As the nonfluorinated anionic emulsifier, there may be mentioned, for example, laurylsulfuric acid and like alkylsulfuric acids, and salts thereof; dodecylbenzenesulfonic acid and like alkylarylsulfonic acids, and salts thereof; lauric acid and like aliphatic (carboxylic) acids, and salts thereof; phosphoric acid alkyl esters, phosphoric acid alkylaryl esters, and salts thereof; and sulfosuccinic acid alkyl esters and salts thereof. The nonfluorinated anionic emulsifier may comprise one or a combination of two or more of these compounds.

As the hydrocarbon moieties constituting the above-mentioned alkylsulfonic acids or aliphatic carboxylic acids, or salts thereof, there may be mentioned, for example, saturated or unsaturated aliphatic chains containing 6 to 40 carbon atoms, preferably 8 to 20 carbon atoms. The saturated or unsaturated aliphatic chains may be straight or branched and may have a cyclic structure. The hydrocarbons mentioned above may be aromatic or may contain, an aromatic group. The above hydrocarbons may contain such a hetero atom(s) as an oxygen, nitrogen or sulfur atom(s).

The above aliphatic carboxylic acids or salts thereof are more preferably saturated or unsaturated aliphatic carboxylic acids containing 9 to 13 carbon atoms or salts thereof. Preferred as such aliphatic carboxylic acids are monocarboxylic acids, and preferred monocarboxylic acids are decanoic acid, undecanoic acid, undecenoic acid, lauric acid and hydrododecanoic acid.

The above-mentioned sulfosuccinic acid alkyl esters or salts thereof may be monoesters but preferably are diesters.

As the sulfosuccinic alkyl esters or salts thereof, there may be mentioned, for example, sulfosuccinic acid alkyl esters or salts thereof represented by the general formula (I)

$$R^1\text{—OCOCH(SO}_3\text{A)CH}_2\text{COO—}R^2 \qquad (I)$$

wherein $R^1$ and $R^2$ are the same or different and each represents an alkyl group containing 4 to 12 carbon atoms and A represents an alkali metal, an alkaline earth metal or $NH_4$.

As $R^1$ and $R^2$ in the above general formula (I), there may be mentioned straight or branched alkyl groups such as, for example, n-butyl, isobutyl, sec-butyl, n-pentyl, isopentyl, neopentyl, tert-pentyl, n-hexyl, isohexyl, tert-hexyl, n-heptyl, isoheptyl, tert-heptyl, n-octyl, isooctyl, tert-octyl, n-nonyl, isononyl, tert-nonyl, n-decyl and 2-ethylhexyl.

Preferred as A in the above general formula (I) are Na and $NH_4$, for example. As the above sulfosuccinic acid alkyl esters, there may be mentioned, for example, di-n-octyl sulfosuccinate and di-2-ethylhexyl sulfosuccinate.

Preferred as the nonfluorinated anionic emulsifier mentioned above are ones selected from the group consisting of alkylsulfonic acids, aliphatic carboxylic acids, and salts thereof as well as sulfosuccinic acid alkyl esters and salts thereof. Aliphatic carboxylic acids and salts thereof as well as sulfosuccinic acid alkyl esters and salts thereof are more preferred.

Further, the nonfluorinated anionic emulsifier is more preferably dioctyl sulfosuccinate or laurylsulfuric acid, or a salt thereof, still more preferably dioctyl sulfosuccinate sodium salt or sodium laurylsulfate.

The aqueous fluororesin dispersion according to the invention has a fluorinated surfactant content reduced to a level corresponding to 100 ppm of the melt-processable fluororesin or below. From the ready removability viewpoint, the fluorinated surfactant is preferably one having an average molecular weight of not higher than 1000, more preferably an average molecular weight of not higher than 500; further, it is preferably one containing 5 to 12 carbon atoms.

As the fluorinated surfactant, there may be mentioned fluorinated anionic surfactants. As the fluorinated anionic surfactants, there may be mentioned, for example, perfluorooctanoic acid and/or a salt thereof (hereinafter "perfluorooctanoic acid and/or a salt thereof" is sometimes collectively referred to as "PFOA") and perfluorooctylsulfonic acid and/or a salt thereof (hereinafter"perfluorooctylsulfonic acid and/or a salt thereof" is sometimes collectively referred to as "PFOS"), among others.

In the practice of the invention, the above fluorinated surfactant preferably comprises a perfluorocarboxylic acid and/or a salt thereof. In cases where the fluorinated anionic compound is in the form of a salt, the counter ion forming the salt is an alkali metal ion or $NH_4^+$, for instance, and the alkali metal ion is, for example, $Na^+$ or $K^+$. $NH_4^+$ is preferred as the counter ion, however. When the PFOA or PFOS mentioned above is in the form of a salt, the salt is not particularly restricted but may be the ammonium salt, among others.

The content of the fluorinated surfactant in the aqueous fluororesin dispersion of the invention may preferably be at a level corresponding to 50 ppm, more preferably 20 ppm, still more preferably 10 ppm, of the melt-processable fluororesin or below; most preferably, it is below the detection limit or, in other word, zero.

The content of the fluorinated surfactant, so referred to herein, is measured by adding an equal amount of methanol to the aqueous fluororesin dispersion, further adding a 5% aqueous solution of ammonium carbonate until coagulation occurs, and after Soxhlet extraction, subjecting the extract to high-performance liquid chromatography [HPLC].

The aqueous fluororesin dispersion of the invention may be one containing a nonfluorinated nonionic surfactant in an amount within the range mentioned later herein. The aqueous fluororesin dispersion may be one containing one single nonfluorinated nonionic surfactant or two or more such surfactants.

The above-mentioned nonfluorinated nonionic surfactant is not particularly restricted but may be any of those conventional ones such as ones comprising a fluorine-free nonionic compound or compounds. As the above nonionic surfactant, there may be mentioned, for example, ether type nonionic surfactants such as polyoxyethylene alkylphenyl ethers, polyoxyethylene alkyl ethers and polyoxyethylenealkylene alkyl ethers; polyoxyethylene derivatives such as ethylene oxide/propylene oxide block copolymers; ester type nonionic surfactants such as sorbitan fatty acid esters, polyoxyethylenesorbitan fatty acid esters, polyoxyethylenesorbitol fatty acid esters, glycerol fatty acid esters and polyoxyethylene fatty acid esters; amine type nonionic surfactants such as polyoxyethylenealkylamines and alkylalkanolamides; and so forth. The above-mentioned nonfluorinated nonionic surfactant preferably has an inorganicity/organicity ratio of 1.07 to 1.50.

The hydrophobic group in the compound constituting the above-mentioned nonfluorinated nonionic surfactant may be an alkylphenol group, a straight alkyl group or a branched alkyl group but preferably is one having no benzene ring therein, for example a compound having no alkylphenol group in the structure thereof.

Preferred as the nonfluorinated nonionic surfactant are, among others, polyoxyethylene alkyl ether type nonionic surfactants. Preferred as the polyoxyethylene alkyl ether type nonionic surfactants are those having a polyoxyethylene alkyl ether structure in which the alkyl group contains 10 to 20 carbon atoms, more preferably having a polyoxyethylene alkyl ether structure in which the alkyl group contains 10 to 15 carbon atoms. The alkyl group in the above-mentioned polyoxyethylene alkyl ether structure preferably has a branched structure.

As the polyoxyethylene alkyl ether type nonionic surfactants, there may be mentioned, for example, GENAPOL X080 (product name, product of Clariant Corp.), TERGITOL 9-S-15 (product name, product of Clariant Corp.), NOIGEN TDS-80 (product name, product of Daiichi Kogyo Seiyaku Co.) and LEOCOL TD90 (product name, product of LION Corp.).

The concentration of the nonfluorinated nonionic surfactant in the aqueous fluororesin dispersion of the invention is preferably at a level corresponding to 0.1 to 15% by mass of the melt-processable fluororesin. The concentration of the nonfluorinated nonionic surfactant is preferably at a level corresponding to 0.2% by mass or higher and preferably at a level corresponding to 10% by mass or lower. When the concentration of the nonfluorinated nonionic surfactant is above a level corresponding to 15% by mass, the economic efficiency may be impaired and, when it is below a level corresponding to 0.1% by mass, the aqueous fluororesin dispersion may be poor in dispersion stability.

In the present specification, the concentration (N) of the nonfluorinated nonionic surfactant in the aqueous fluororesin dispersion is determined in the following manner. About 1 g (X g) of the sample is placed in an aluminum cup with a diameter of 5 cm and heated at 100° C. for 1 hour, the residue on heating (Y g) is further heated at 300° C. for 1 hour, and the concentration (N) is calculated from the final residue on heating (Z g) according to the formula: $N=[(Y-Z)/Z] \times 100(\%)$.

The aqueous fluororesin dispersion of the invention can have an electric conductivity, at 25° C., of not lower than 10 µS/cm, preferably not lower than 100 µS/cm. So long as the above-mentioned electric conductivity is within the range mentioned above, the upper limit thereto is not particularly restricted but is preferably at 10000 µS/cm, more preferably 5000 µS/cm.

The electric conductivity, so referred to herein, is measured using an electric conductivity meter (product of ORION).

In spite of the fact that the concentrations of the melt-processable fluororesin and fluorinated surfactant are within the respective ranges mentioned above, the aqueous fluororesin dispersion of the invention has good dispersion stability without causing any significant impairments in crack resistance and mechanical stability.

Such aqueous fluororesin dispersion of the invention as mentioned hereinabove can be obtained, for example, by bringing a raw aqueous fluororesin dispersion comprising particles of a melt-processable fluororesin as dispersed in an aqueous medium into contact with an ion exchange resin for treatment therewith and to concentration by phase separation. Such production method and the aqueous fluororesin dispersion that can be obtained by that method also constitute an aspect of the present invention.

The above-mentioned raw aqueous fluororesin dispersion comprises particles of a melt-processable fluororesin as dispersed in an aqueous medium. The melt-processable fluororesin in the raw aqueous fluororesin dispersion is of the same kind as the melt-processable fluororesin mentioned above.

The raw aqueous fluororesin dispersion may be one obtained by after-treatment, for example fluorinated surfactant content reducing treatment and/or concentration, following the polymerization of the melt-processable fluororesin mentioned above, or one obtained by carrying out the polymerization mentioned above without experiencing the step of concentration (the so-called "virgin aqueous dispersion"). The fluorinated surfactant content in the virgin aqueous dispersion is generally at a level corresponding to 500 to 20000 ppm of the melt-processable fluororesin.

The melt-processable fluororesin concentration in the above-mentioned raw aqueous fluororesin dispersion is generally 5 to 70% by mass, preferably 5 to 60% by mass, more preferably 10 to 40% by mass, still more preferably 15 to 35% by mass.

The above-mentioned treatment in contact with an ion exchange resin can be carried out preferably by the method described in Japanese Kohyo Publication 2002-532583 and, in the case of achieving the purpose of reducing the fluorinated surfactant (e.g. PFOA) content, an anion exchange resin is generally used.

The above-mentioned ion exchange resin contact treatment can be carried out, for example, by bringing the above-mentioned raw aqueous fluororesin dispersion, if necessary supplemented with a nonfluorinated nonionic surfactant, into contact with an anion exchanger comprising a strongly basic resin adjusted to OH form in advance. The contact treatment with such an anion exchanger is preferably carried out by placing the raw aqueous fluororesin dispersion adjusted to pH 7 to 9 in a basic environment.

When the above-mentioned ion exchange resin contact treatment is carried out in the presence of a nonfluorinated nonionic surfactant added as mentioned above, the concentration of that surfactant is preferably at a level corresponding to 1 to 40% by mass, more preferably 1 to 30% by mass, still more preferably 1 to 20% by mass, relative to the melt-processable fluororesin.

The above-mentioned concentration by phase separation can be carried out by adding the above-mentioned nonfluorinated nonionic surfactant, to a concentration to be mentioned later herein, to the raw aqueous fluororesin dispersion according to need, heating the raw aqueous fluororesin dispersion to thereby cause separation into a melt-processable fluororesin-free phase (supernatant phase) and a melt-processable fluororesin-containing phase (concentrated phase) and removing the melt-processable fluororesin-free phase to obtain the melt-processable fluororesin-containing phase.

The separation of the melt-processable fluororesin-free phase from the melt-processable fluororesin-containing phase is preferably carried out within the temperature range of the cloud point of the nonfluorinated nonionic surfactant added plus/minus 15° C., more preferably within the range of that cloud point plus/minus 10° C.

The cloud point mentioned above means the temperature at which an aqueous solution of the nonfluorinated nonionic surfactant, after once having become turbid upon heating, becomes wholly clear again upon gradual cooling. In the present specification, the above-mentioned cloud point is the value measured, according to ISO 1065 (Method A), as the temperature at which 15 ml of the diluted measurement sample placed in a test tube as once heated until a completely opaque condition becomes wholly transparent again upon gradual cooling with stirring.

The method of removing the above-mentioned melt-processable fluororesin-free phase is not particularly restricted but maybe any of the conventional methods, for example decantation.

The above-mentioned concentration by phase separation is carried out in the presence of an electrolyte and/or a nonfluorinated anionic emulsifier. There is no aqueous fluororesin dispersion known in the art that comprises melt-processable fluororesin particles dispersed therein and has a very low fluorinated surfactant content and a high melt-processable fluororesin concentration. The method for producing aqueous fluororesin dispersions according to the invention makes it possible to concentrate aqueous fluororesin dispersions even when the fluorinated surfactant content is very low and to obtain aqueous fluororesin dispersions high in melt-processable fluororesin concentration by causing the above-mentioned electrolyte and/or nonfluorinated anionic emulsifier to exist in the step of the concentration by phase separation.

The above-mentioned concentration by phase separation is preferably carried out in the presence of the electrolyte in an amount corresponding to 10 to 10000 ppm of the melt-processable fluororesin and/or the nonfluorinated anionic emulsifier in an amount corresponding to 10 to 10000 ppm of the melt-processable fluororesin. When the amount of the electrolyte and/or nonfluorinated anionic emulsifier is smaller than the above range, the concentration by phase separation may become sometimes difficult and, at levels beyond the above range, the economic efficiency may be impaired.

The amount of the electrolyte in the above-mentioned concentration by phase separation is more preferably at a level corresponding to 100 ppm of the melt-processable fluororesin or a higher level up to a level corresponding to 5000 ppm. The amount of the nonfluorinated anionic emulsifier in the above concentration by phase separation is more preferably at a level corresponding to 100 ppm of the melt-processable fluororesin or a higher level up to a level corresponding to 5000 ppm. At levels below the range mentioned above, problems may arise; for example, the rate of phase separation in the step of the concentration by phase separation becomes slow, the floating polymer fraction in the supernatant phase increases and the rate of recovery decreases, and/or the concentrated phase cannot be obtained in a sufficiently highly concentrated condition. At levels exceeding the above range, the mechanical stability and storage stability of the aqueous dispersion obtained may be inferior.

The above-mentioned electrolyte and/or nonfluorinated anionic emulsifier is preferably added after bringing the raw aqueous fluororesin dispersion into contact with the ion exchange resin and prior to carrying out the concentration by phase separation.

The amount of the above-mentioned electrolyte and/or nonfluorinated anionic emulsifier is preferably at a level corresponding to 10 to 10000 ppm of the melt-processable fluororesin, more preferably at a level corresponding to 100 to 3000 ppm of the melt-processable fluororesin, still more preferably at a level corresponding to 500 to 2500 ppm of the melt-processable fluororesin.

As the nonfluorinated nonionic surfactant to be used in the above-mentioned concentration by phase separation, there may be mentioned those given hereinabove as examples referring to the aqueous fluororesin dispersion of the present invention and, among them, those having an inorganicity/organicity ratio of 1.07 to 1.50 are preferred.

The concentration of the nonfluorinated nonionic surfactant in the above concentration by phase separation is preferably at a level corresponding to 1 to 40% by mass, more preferably 1 to 30% by mass, still more preferably 1 to 20% by mass, of the melt-processable fluororesin mentioned above. When the concentration of the nonfluorinated nonionic surfactant is below a level corresponding to 1% by mass of the melt-processable fluororesin, the concentration by phase separation may sometimes become difficult and, when it is in excess of a level corresponding to 40% by mass of the melt-processable fluororesin, the economic efficiency may possibly be impaired.

The above-mentioned concentration by phase separation is preferably carried out after addition of the above-mentioned electrolyte and/or nonfluorinated anionic emulsifier to the raw aqueous fluororesin dispersion to give a dispersion having an electric conductivity, at 25° C., of 100 μS/cm or higher, preferably 200 μS/cm or higher. The upper limit to the above-mentioned electric conductivity is not particularly restricted but preferably is not higher than 10000 μS/cm, more preferably not higher than 5000 μS/cm.

The above-mentioned concentration by phase separation is generally carried out after the above-mentioned treatment in contact with an ion exchange resin. So long as the concentration by phase separation is carried out after carrying out the above-mentioned ion exchange resin contact treatment, the resin-containing phase after the concentration by phase separation may be again subjected to ion exchange resin contact treatment according to need, without any particular restriction.

The aqueous fluororesin dispersion of the invention, either as such or after addition of one or more of various additives thereto, can be processed into coatings, cast films, impregnated products and so forth. The dispersion may also be used in a diluted form or in admixture with another dispersion and/or a certain compound(s), for instance.

As the fields of application of the above-mentioned aqueous fluororesin dispersion, there may be mentioned, for example, oven inside linings, coatings or coverings on ice-making trays, other cooking utensils, electric wires, pipes, ship bottoms, high-frequency printed circuit boards, conveyer belts and iron sole plates; fibrous base materials, woven fabrics and nonwoven fabrics, among others. The above-mentioned fibrous base materials are not particularly restricted but, for example, glass fibers, carbon fibers and aramid fibers (KEVLAR (registered trademark) fibers, etc.) can be impregnated with the dispersion to give impregnated products; etc. Further, the dispersion can also be used as a binder for battery active materials. The above-mentioned aqueous fluororesin dispersion can be processed by the conventional methods known in the art.

The aqueous fluororesin dispersion of the invention can also be processed into a fluororesin powder, moldings and so forth.

The above-mentioned fluororesin powder is very low in fluorinated surfactant content and, therefore, is useful as an excellent material for molded articles. The above-mentioned fluororesin powder and fluororesin moldings can be prepared by the conventional methods according to the desired uses.

Effects of the Invention

The aqueous fluororesin dispersion of the invention, which has the constitution described hereinabove, is very low in fluorinated surfactant content and is excellent in dispersion stability in spite of its high melt-processable fluororesin concentration.

The method for producing aqueous fluororesin dispersion according to the invention, which has the constitution described hereinabove, can efficiently give aqueous fluororesin dispersions very low in fluorinated surfactant content and high in melt-processable fluororesin concentration.

BEST MODES FOR CARRYING OUT THE INVENTION

The following examples, including a comparative example, illustrate the present invention in further detail. They are, however, by no means limitative of the scope of the invention. In the examples and comparative example, "part (s)" and "%", unless otherwise specified, represent "part (s) by mass" and "% by mass", respectively.

The measurements in the examples and comparative examples were carried out by the following methods.

(1) Fluororesin Concentration (P)

About 1 g (X) of the sample was placed in an aluminum cup with a diameter of 5 cm, dried at 100° C. for 1 hour and further dried at 300° C. for 1 hour and, based on the thus-obtained residue (Z) on heating, the concentration P was calculated as follows:

$P=Z/X\times 100(\%)$.

(2) Fluorinated Surfactant Concentration

To the aqueous fluororesin dispersion obtained was added an equal volume of methanol and, further, a 5% aqueous solution of ammonium carbonate was added until coagulation occurred. The resulting mixture was subjected to Soxhlet extraction, and the extract was subjected to high-performance liquid chromatography [HPLC] under the conditions mentioned below. In calculating the fluorinated surfactant concentration, a working curve constructed by subjecting fluorinated surfactant solutions with known concentrations to the same extraction and HPLC measurements under the same conditions was used.

(Measurement Conditions)

Column: ODS-120T (4.6 ø×250 mm, product of TOSOH Corp.)

Developing solution: Acetonitrile/0.6% aqueous solution of perchloric acid=1/1 (vol/vol %)

Sample size: 20 μL

Flow rate: 1.0 ml/minute

Detection wavelength: UV 210 nm

Column temperature: 40° C.

(3) Nonfluorinated Nonionic Surfactant Content (N) in Aqueous Fluororesin Dispersion About 1 g (X g) of the sample was placed in an aluminum cup with a diameter of 5 cm, heated at 100° C. for 1 hour to give a residue (Y g) on heating, the thus-obtained residue (Y g) on heating was further heated at 300° C. for 1 hour, and, based on the thus-obtained residue (Z g) on heating, the content N was calculated as follows: $N=[(Y-Z)/Z]\times 100(\%)$.

(4) Average Primary Particle Diameter of Melt-Processable Fluororesin Particles

The diameter was determined by subjecting the aqueous fluororesin dispersion to be measured to measurement by the dynamic light scattering method.

(5) Electric Conductivity at 25° C.

The measurement was made using an electric conductivity meter (product of ORION).

(6) Surface Tension

The measurement was made by the Wilhelmy method at 25° C.

Example 1

(1) Treatment in Contact With Ion Exchange Resin

A 10% aqueous solution (150 L) of polyoxyethylene alkyl ether (LEOCOL TD90, trade name, product of LION Corp.) as a nonfluorinated nonionic surfactant was passed through a column. (30 cm in diameter, 200 cm in height) packed with 150 L of Amberjet IRA 4002 OH (trade name, product of ROHM AND HAAS Company) as an OH-form anion exchange resin over 1 hour.

An aqueous FEP dispersion (600 L; FEP particles having an average primary particle diameter of 100 nm) adjusted to a fluororesin concentration of 35%, a LEOCOL TD90 concentration of 10% relative to the fluororesin and a PFOA concentration of 1020 ppm of the fluororesin was passed through the above column over 4 hours (space velocity (SV)=0.5), whereby a FEP dispersion (fluororesin concentration: 35% by mass, nonfluorinated nonionic surfactant concentration:

10%/fluororesin) was obtained. The PFOA concentration in the FEP dispersion obtained was below the detection limit (10 ppm).

(2) Concentration by Phase Separation

To the FEP dispersion obtained in Example 1 by the treatment in contact with the ion exchange resin was added LEOCOL TD90 in a further amount corresponding to 10% of the fluororesin, ammonium sulfate was then added in an amount corresponding to 1250 ppm of the fluororesin, the fluororesin concentration was adjusted to 30% by addition of water and, further, the pH was adjusted to 9.5 with aqueous ammonia. The dispersion obtained had an electric conductivity at 25° C. of 1360 µS/cm. This dispersion was allowed to stand at 70° C. for 5 hours; it separated into two phases, namely a substantially fluororesin-free phase (supernatant phase) and a concentrated phase. The supernatant phase was removed and the concentrated phase was recovered; thus was obtained an aqueous fluororesin dispersion having a fluororesin concentration of 65%, having a nonfluorinated nonionic surfactant concentration at a level corresponding to 5.6% of the fluororesin, containing fluororesin particles with an average primary particle diameter of 100 nm and having an electric conductivity at 25° C. of 450 µS/cm.

Example 2

To the FEP dispersion obtained in Example 1 by the treatment in contact with the ion exchange resin was added LEOCOL TD90 in a further amount corresponding to 10% of the fluororesin, sodium dioctyl sulfosuccinate (0.1% (by mass) aqueous solution thereof having a surface tension of 26 mN/m at 25° C.), in the form of a 70% methanol solution, was added in an amount corresponding to 1856 ppm of the fluororesin, the fluororesin concentration was adjusted to 30% by addition of water and, further, the pH was adjusted to 9.5 with aqueous ammonia. The dispersion obtained had an electric conductivity at 25° C. of 380 µS/cm. This dispersion was allowed to stand at 70° C. for 5 hours; it separated into two phases. The supernatant phase was removed and the concentrated phase was recovered; thus was obtained an aqueous fluororesin dispersion having a fluororesin concentration of 61%, having a nonfluorinated nonionic surfactant concentration at a level corresponding to 5.3% of the fluororesin, containing fluororesin particles with an average primary particle diameter of 100 nm and having an electric conductivity at 25° C. of 120 µS/cm.

Example 3

To the FEP dispersion obtained in Example 1 by the treatment in contact with the ion exchange resin was added LEOCOL TD90 in a further amount corresponding to 10% of the fluororesin, sodium lauryl sulfate was added in an amount corresponding to 1204 ppm of the fluororesin, the fluororesin concentration was adjusted to 30% by addition of water and, further, the pH was adjusted to 9.5 with aqueous ammonia. The dispersion obtained had an electric conductivity at 25° C. of 450 µS/cm. This dispersion was allowed to stand at 70° C. for 5 hours; it separated into two phases. The supernatant phase was removed and the concentrated phase was recovered; thus was obtained an aqueous fluororesin dispersion having a fluororesin concentration of 61%, having a nonfluorinated nonionic surfactant concentration at a level corresponding to 5.2% of the fluororesin, containing fluororesin particles with an average primary particle diameter of 100 nm and having an electric conductivity at 25° C. of 150 µS/cm.

Example 4

To the FEP dispersion obtained in Example 1 by the treatment in contact with the ion exchange resin was added LEOCOL TD90 in a further amount corresponding to 10% of the fluororesin; thereto were added ammonium sulfate in an amount corresponding to 1250 ppm of the fluororesin and sodium dioctyl sulfosuccinate (0.1% (by mass) aqueous solution thereof having a surface tension of 26 mN/m at 25° C.), in the form of a 70% methanol solution, in an amount corresponding to 1856 ppm of the fluororesin and, further, the pH was adjusted to 9.5 with aqueous ammonia. The dispersion obtained had an electric conductivity at 25° C. of 1300 µS/cm. This dispersion was allowed to stand at 70° C. for 5 hours; it separated into two phases. The supernatant phase was removed and the concentrated phase was recovered; thus was obtained an aqueous fluororesin dispersion having a fluororesin concentration of 63%, having a nonfluorinated nonionic surfactant concentration at a level corresponding to 5.7% of the fluororesin, containing fluororesin particles with an average primary particle diameter of 100 am and having an electric conductivity at 25° C. of 400 µS/cm.

Example 5

To the FEP dispersion obtained in Example 1 by the treatment in contact with the ion exchange resin was added LEOCOL TD90 in a further amount corresponding to 10% of the fluororesin; thereto were added ammonium sulfate in an amount corresponding to 1250 ppm of the fluororesin and sodium lauryl sulfate (0.1% (by mass) aqueous solution thereof having a surface tension of 28 mN/m at 25° C.) in an amount corresponding to 1204 ppm of the fluororesin and, further, the pH was adjusted to 9.5 with aqueous ammonia. The dispersion obtained had an electric conductivity at 25° C. of 1400 µS/cm. This dispersion was allowed to stand at 70° C. for 5 hours; it separated into two phases. The supernatant phase was removed and the concentrated phase was recovered; thus was obtained an aqueous fluororesin dispersion having a fluororesin concentration of 64%, having a nonfluorinated nonionic surfactant concentration at a level corresponding to 5.7% of the fluororesin, containing fluororesin particles with an average primary particle diameter of 100 nm and having an electric conductivity at 25° C. of 500 µS/cm.

Example 6

To the FEP dispersion obtained in Example 1 by the treatment in contact with the ion exchange resin was added LEOCOL TD90 in a further amount corresponding to 8.3% of the fluororesin, LEOCOL TD70 (trade name, product of LION Corp.) was added in an amount of 1.7% of the fluororesin, ammonium sulfate was added in an amount corresponding to 1250 ppm of the fluororesin, and the pH was adjusted to 9.5 with aqueous ammonia. The dispersion obtained had an electric conductivity at 25° C. of 1230 µS/cm. This dispersion was allowed to stand at 70° C. for 5 hours; it separated into two phases. The supernatant phase was removed and the concentrated phase was recovered; thus was obtained an aqueous fluororesin dispersion having a fluororesin concentration of 64%, having a nonfluorinated nonionic surfactant concentration at a level corresponding to 5.4% of the fluororesin, containing fluororesin particles with an average primary particle diameter of 100 nm and having an electric conductivity at 25° C. of 400 µS/cm.

Comparative Example 1

To the FEP dispersion obtained in Example 1 by the treatment in contact with the ion exchange resin was added LEO- COL TD90 in a further amount corresponding to 10% of the fluororesin, and the fluororesin concentration was adjusted to 30% by addition of water. Further, the pH was adjusted to 9.5 with aqueous ammonia. This dispersion was allowed to stand at 70° C. for 5 hours; it separated into two phases. The supernatant phase was removed and the concentrated phase was recovered; the fluororesin concentration was as low as 46%.

INDUSTRIAL APPLICABILITY

The aqueous fluororesin dispersion of the invention, which has the constitution described hereinabove, can be processed into coatings, cast films, impregnated products and so forth.

The invention claimed is:

1. A method for producing an aqueous fluororesin dispersion,
    wherein a crude aqueous fluororesin dispersion comprising a melt-processable fluororesin particle dispersed in an aqueous medium is subjected to a treatment in contact with an ion exchange resin and a concentration by phase separation in the presence of an electrolyte and/or a nonfluorinated anionic emulsifier to thereby obtain the aqueous fluororesin dispersion,
    wherein the crude aqueous fluororesin dispersion is brought into contact with the ion exchange resin, and then, after the step of adding the electrolyte and/or the nonfluorinated anionic emulsifier, the concentration by phase separation is carried out,
    wherein the electrolyte is at least one selected from the group consisting of sulfuric acid, succinic acid, carbonic acid, and salts thereof, and
    wherein the nonfluorinated anionic emulsifier is one such that a 0.1% (by mass) aqueous solution thereof has a surface tension of not higher than 60 mN/m.

2. The method for producing the aqueous fluororesin dispersion according to claim 1,
    wherein the electrolyte and/or nonfluorinated anionic emulsifier is added in an amount corresponding to 10 to 10000 ppm of the melt-processable fluororesin.

3. The method for producing the aqueous fluororesin dispersion according to claim 1,
    wherein the concentration by phase separation is carried out in the presence of the electrolyte in an amount corresponding to 10 to 10000 ppm of the melt-processable fluororesin and/or the nonfluorinated anionic emulsifier in an amount corresponding to 10 to 10000 ppm of the melt-processable fluororesin.

4. The method for producing the aqueous fluororesin dispersion according to claim 1,
    wherein a concentration of the melt-processable fluororesin after concentration by the phase separation step is 55 to 75% by mass relative to the aqueous fluororesin dispersion, and
    a fluorinated surfactant content in the aqueous fluororesin dispersion is not higher than a level corresponding to 100 ppm of the melt-processable fluororesin.

5. The method for producing the aqueous fluororesin dispersion according to claim 1,
    wherein the aqueous fluororesin dispersion has an electric conductivity of not lower than 10 μS/cm.

6. The method for producing the aqueous fluororesin dispersion according to claim 1,
    wherein the melt-processable fluororesin particle has an average primary particle diameter of 10 to 400 nm.

* * * * *